(12) United States Patent
Yamaguchi et al.

(10) Patent No.: US 6,440,609 B1
(45) Date of Patent: Aug. 27, 2002

(54) NON-AQUEOUS ELECTROLYTIC CELL COMPRISING LOW WEIGHT PERCENT OF CARBON FIBERS

(75) Inventors: Akira Yamaguchi; Atsuo Omaru; Masayuki Nagamine, all of Fukushima (JP)

(73) Assignee: Sony Corporation, Tokyo (JP)

( * ) Notice: Subject to any disclaimer, the term of this patent is extended or adjusted under 35 U.S.C. 154(b) by 8 days.

(21) Appl. No.: 09/605,677

(22) Filed: Jun. 28, 2000

(30) Foreign Application Priority Data

Jun. 29, 1999 (JP) ............................................ 11-183607

(51) Int. Cl.$^7$ ............................................. H01M 10/24
(52) U.S. Cl. ................................ 429/231.8; 429/231.95
(58) Field of Search ......................... 429/231.95, 231.8; 252/502; 423/414

(56) References Cited

U.S. PATENT DOCUMENTS

| | | | |
|---|---|---|---|
| 5,443,928 A | | 8/1995 | Takeuchi et al. ............ 429/218 |
| 5,612,155 A | * | 3/1997 | Takami et al. ............... 429/218 |
| 5,856,043 A | | 1/1999 | Ohsaki et al. ............... 429/218 |
| 6,287,729 B1 | * | 9/2001 | Tamaki et al. ............. 429/231.8 |

FOREIGN PATENT DOCUMENTS

| | | |
|---|---|---|
| EP | 0644603 | 3/1995 |
| EP | 0803926 | 10/1997 |
| EP | 0817293 | 1/1998 |

* cited by examiner

*Primary Examiner*—Patrick Ryan
*Assistant Examiner*—M. Wills
(74) *Attorney, Agent, or Firm*—Sonnenschein, Nath & Rosenthal

(57) ABSTRACT

The present invention improves cell characteristics at a low temperature. The negative electrode contains fiber carbon, which enables smooth doping and dedoping of lithium ions at a low temperature. Accordingly, the internal resistance value at a low temperature is reduced and the cell capacity value is increased.

9 Claims, 1 Drawing Sheet

NON-AQUEOUS ELECTROLYTIC CELL COMPRISING LOW WEIGHT PERCENT OF CARBON FIBERS

BACKGROUND OF THE INVENTION

1. Field of the Invention

The present invention relates to a non-aqueous electrolytic cell including a positive electrode, a negative electrode, and a non-aqueous electrolyte.

2. Description of the Relates Arts

Conventionally, a nickel-cadmium cell, a lead cell, and the like have been used as secondary cells for electronic apparatuses. However, with the recent progress in the electronic technology, many of he electronic apparatuses have become smaller and portable, which requires increase of high energy density of the secondary cell for the electronic apparatuses. However, the nickel-cadmium cell or the lead cell has a low discharge voltage and cannot increase the energy density sufficiently.

To cope with this, a so-called lithium-ion cell is studied and developed. The lithium-ion cell has advantages that the discharge voltage is high and the cycle service life is long because of little self discharge. The lithium-ion cell is a non-aqueous electrolytic secondary cell in which the negative electrode is made from a carbon material capable of doping and dedoping lithium ions and the positive electrode is made from a lithium transition metal composite oxide.

In such a lithium-ion cell, firstly, during a charge process, lithium ions are discharged from the positive electrode, after which the lithium ions are inserted between carbons of the negative electrode to form a compound with the carbons. This phenomenon is called doping. During a discharge, lithium atoms contained in the compound of the negative electrode become lithium ions, which are discharged from the negative electrode and again becomes the aforementioned $LiM_xO_y$ in the positive electrode. This phenomenon is called dedoping. That is, in a lithium-ion cell, electric energy is generated by movement of lithium ions.

In order to improve cell characteristics such as the cell initial capacity, internal resistance, and the like in the aforementioned non-aqueous electrolytic cell, the characteristic of the negative electrode is very important in addition to the characteristics of the positive electrode and the non-aqueous electrolyte.

The negative electrode is made from a substance capable of doping and dedoping lithium ions. There can be exemplified a carbon material, a crystalline metal oxide, non-crystalline metal oxide, and the like. The carbon material may be, pyrocarbon, coke, graphite, vitreous carbons, active carbon, or the like.

However, the non-aqueous electrolytic cell produced using the aforementioned material has a problem that when used at a low temperature, lithium ion doping and dedoping cannot be performed smoothly in the negative electrode and it is impossible to obtain a sufficient cell characteristic.

SUMMARY OF THE INVENTION

It is therefore an object of the present invention to provide a non-aqueous electrolytic cell having a preferable cell characteristic at a low temperature. In order to achieve the aforementioned object, the non-aqueous electrolytic cell according to the present invention includes a negative electrode capable doping and dedoping lithium ions, a positive electrode capable of doping and dedoping lithium ions, and a non-aqueous electrolyte, wherein the negative electrode contains fiber carbon.

The non-aqueous electrolytic cell according to the present invention having the aforementioned configuration exhibits preferable cell characteristics at a low temperature.

DESCRIPTION OF PREFERRED EMBODIMENTS

Figure 1:
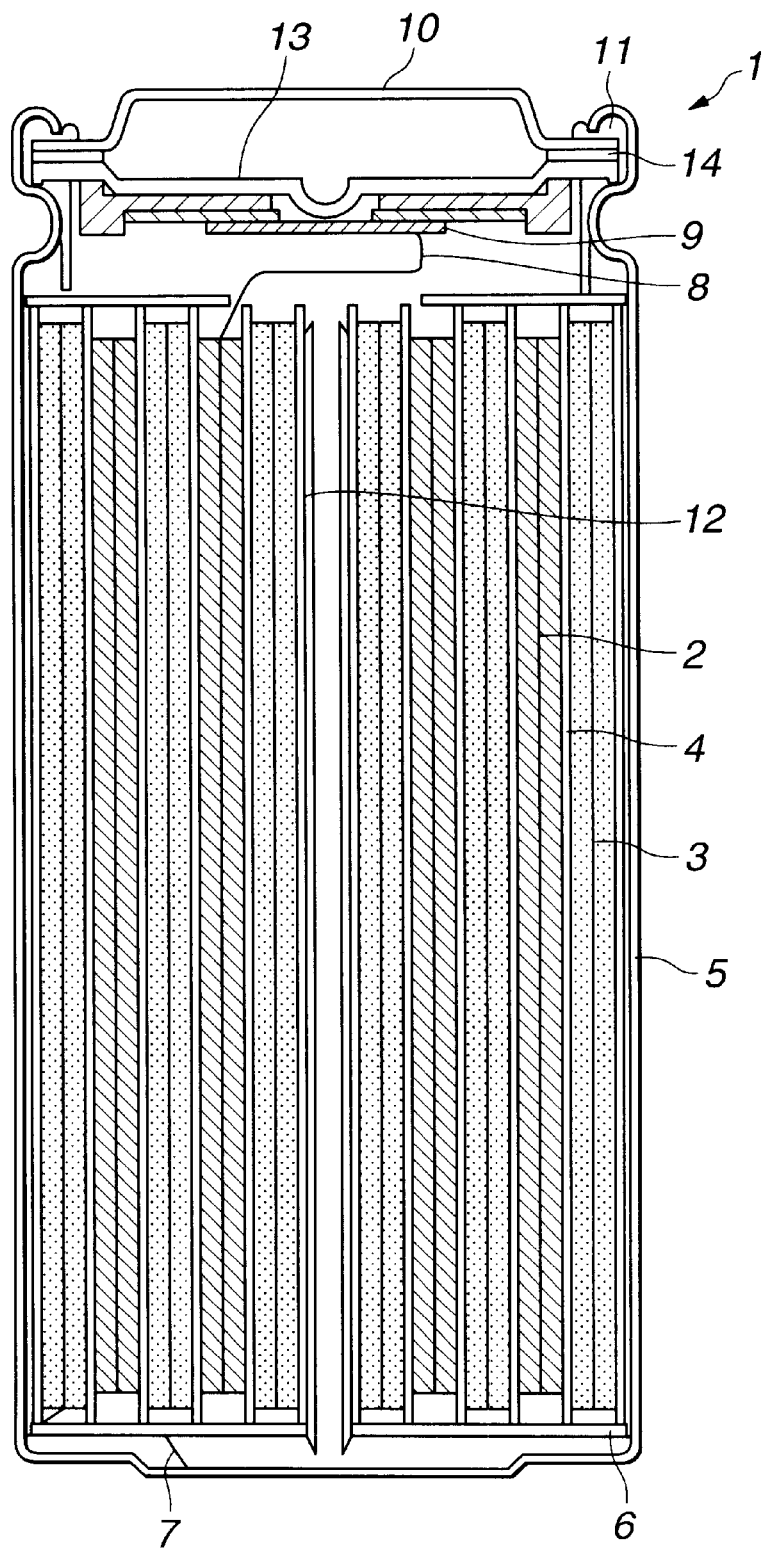
FIG. 1 is a longitudinal cross sectional view of an example of a non-aqueous electrolytic cell according to the present invention.

FIG. 1 is a longitudinal cross sectional view of an example of a non-aqueous electrolytic cell according to the present invention. This non-aqueous electrolytic cell 1 includes a film-shaped positive electrode 2 and a film-shaped negative electrode 3 which are wound via a separator 4 so as to be wound layers which are contained in a cell can 5.

The aforementioned positive electrode 2 is produced by applying a positive electrode composite agent containing a positive electrode active material and an adhesive onto a current collector, which is dried. The current collector may be, for example, a metal foil such as an aluminium foil.

The aforementioned positive electrode active material may be a metal oxide, a metal sulfide, or a particular polymeric material according to the type of cell to be obtained.

For example, when producing a lithium-ion secondary cell, the positive electrode active material may be a metal sulfide or oxide such as $TiS_2$, $MoS_2$, $NbSe_2$, $V_2O_5$, or the like. Moreover, it is possible to use a lithium composite oxide containing as a main content $LiM_xO_2$ (where M represents one or more than one transition metal, and x differs depending on the cell charge/discharge state and is normally between 0.05 and 1.10). The transition metal M constituting this lithium composite oxide is preferably Co, Ni, Mn, Fe, Al, V, Ti, or the like. More specifically, the lithium composite oxide may be $LiCoO_2$, $LiNiO_2$, $LiNi_yCo_{1-y}$ (where $0<y<1$), $LiMn_2O_4$, or the like. Moreover, as the positive electrode active material, an inter-layer compound containing Li may also be used preferably. These lithium composite oxides can generate a high voltage and serves as a positive electrode active material having an excellent energy density. The positive electrode 2 maybe formed using more than one of these positive electrode active materials may be used in combination.

Moreover, the adhesive used in the aforementioned positive electrode composite agent may be known adhesives which are usually used for the cell positive electrode composite agent. Moreover, it is possible to add known binders such as a conductive agent to the positive electrode composite agent.

The negative electrode 3 is produced by applying a negative electrode composite agent containing a negative electrode active material and an adhesive onto a current collector and drying it. The current collector may be a metal foil such as a copper foil.

When producing a lithium-ion secondary cell, it is preferable to use a material capable of doping and dedoping lithium, lithium alloy, or lithium ions. As the material capable of doping and dedoping lithium ions, there can be exemplified non-graphitizable carbon material, graphite material, and other carbon material. More specifically, it is possible to use carbon materials such as pyrocarbon, coke, graphite, organic high-molecular sintered compound, active carbon, or the like. The coke may be a pitch coke, needle coke, petroleum coke, or the like. Moreover, the organic high-molecular sintered compound may be a phenol resin, furan resin, or the like which have been sintered at an appropriate temperature and carbonized.

In addition to the aforementioned carbon materials, as the material capable of doping and dedoping lithium, it is also possible to use a polymer such as polyacetylene and polypyrol and an oxide such as $SnO_2$. Moreover, the lithium alloy may be a lithium-aluminum alloy and the like.

Moreover, as the adhesive of the negative electrode composite agent, it is possible to use known adhesives which are usually used for the negative electrode composite agent of the lithium-ion cell. It is also possible to add known binders to the aforementioned negative electrode composite agent.

In the non-aqueous electrolytic cell according to the present invention, the negative electrode 3 is produced by using the aforementioned negative electrode materials in combination with a fiber carbon produced by a method detailed later.

When the negative electrode 3 contains a fiber carbon, the internal resistance at a low temperature is decreased and the cell capacity is increased.

The fiber carbon used for the negative electrode 3 may be, for example, a high molecule spun into a fiber shape, pitch, and other precursors which have been thermally treated, or so-called epitaxial carbon. The epitaxial carbon can be obtained by applying vapor of an organic substance such as benzene directly onto a substrate at a temperature of about 1000° C. so as to grow a carbon crystal.

Firstly, explanation will be given on the method to obtain a fiber carbon using a thermal treatment. Among the precursors used here, a high molecule spun into a fiber shape may be, for example, polyacrylonitrile (PAN), rayon, polyamide, lignin, polyvinylalcohol, and the like. Moreover, among the precursors, the pitch may be a pitch obtained from tar, asphalt, or the like by way of distillation such as vacuum distillation, normal pressure distillation, steam distillation, and treatments such as thermal condensation polymerization, extraction, chemical polymerization condensation, and the like. The tar may be obtained by a high temperature pyrolysis of coal tar, ethylene bottom oil, crude petroleum, and the like. Moreover, the pitch and the like produced during a dry distillation of lumber also serves as a precursor.

Moreover, the aforementioned pitch may be made from polyvinyl chloride resin, polyvinyl acetate, polyvinyl butyrate, 3,5-dimethylphenol resin, and the like as raw materials.

In the aforementioned pitch, when maintained at about 400° C., aromatic rings contained in the pitch are condensed with one another into a multi-ring layered-orientated state. After this, when the temperature is increased above 500° C., the pitch becomes a solid carbon precursor, i.e., semi coke. This process is called a liquid-phase carbonization, which is typical in the process for producing a graphitizable carbon.

In order to make the precursor unmeltable and stable, acid, oxygen, ozone, or the like is used for oxidizing the surface of the precursor. The oxidization method may be selected depending on the type of the precursor. However, the temperature in the oxidization should be below the melting point of the precursor. After the precursor has become unmeltable and stable, the precursor will not cause melting or pyrolysis during a carbonization which will be detailed later. It should be noted that the process for making the precursor unmeltable and stable may be repeated several times if necessary. The precursor becomes sufficiently unmeltable and stable by repeating the aforementioned process several times.

The precursor which has become unmeltable and stable is then subjected to a thermal treatment in an inert gas such as nitrogen of 300° C. to 700° C. for carbonization. It should be noted that this carbonization process may be omitted depending on a particular case.

The precursor which has been carbonized is calcinated in an inert gas so as to obtain a fiber carbon. The calcination conditions are as follows: the temperature increase speed is 1° C. to 100° C./minute, the final temperature is 900° C. to 1500° C., and the holding time at the final temperature is about 0 to 30 hours.

Next, explanation will be given on a method to obtain a fiber carbon by vapor-phase epitaxis. In this case, the raw material may be any if it can be vaporized such as ethylene and propane which exist as a vapor at a room temperature or a material which can be vaporize when heated by a temperature below the pyrolysis temperature.

The aforementioned raw material is applied directly onto the substrate. By performing the aforementioned process, the raw material grows a crystal into a fiber carbon. The temperature of the substrate is preferably 400° C. to 1500° C., but can be selected according to the type of the raw material. Moreover, the substrate is preferably made from quartz, nickel, or the like but can be selected according to the type of the raw material.

It should be noted that it is possible to use a catalyst for promoting the aforementioned epitaxis. The catalysis may be iron, nickel, mixture of iron and nickel, or the like which have been made into fine particles. It is also use as the catalyst metals which are generally called a graphitizing catalyst or an oxide of the graphitizing catalyst. The catalyst may be selected depending on the raw material.

The fiber carbon may have an outer diameter and length selected according to the production conditions. When producing a fiber carbon by a thermal treatment of a high molecule spun material, the outer diameter and length of the fiber carbon can be adjusted by the inner diameter of the blow nozzle and the blow speed for forming a fiber shape. When producing fiber carbon by the vapor-phase expitaxy, the outer diameter and the length can be a adjusted by selecting a size of a substrate and a catalyst serving as a kernel of the crystal epitaxy. Moreover, the outer diameter and the length can be adjusted by defining the raw material supply quantity.

It should be noted that the fiber carbon thus obtained may further be subjected to a graphitizing process in an inert gas stream. The graphitization conditions are as follows: the temperature increase speed is 1° C. to 100° C./minute, the target temperature is above 2000° C. and preferably, above 2500° C., and the target temperature is maintained for about 0 to 30 hours.

Moreover, the fiber carbon obtained may be crushed according to the electrode thickness and the active material particle size. When the fiber carbon is crushed for use, it is possible to use a single fiber carbon as well. It should be noted that the crushing may be performed before or after the carbonization and calcination or during a temperature increase before the carbonization.

The content of the aforementioned fiber carbon is preferably not less than 0.02 weight % and not greater than 5 weight % and more preferably, not less than 0.05 weight % and not greater than weight %. When the content is not less than 5 weight %, the internal resistance value at a low temperature is increased and the cell capacity value is decreased. Moreover, when the content is below 0.02 weight %, it becomes impossible to obtain a sufficient effect of the fiber carbon contained.

The outer diameter of the fiber carbon is preferably not greater than 20 $\mu$m. When the outer diameter is greater than 20 $\mu$m, it becomes impossible to obtain a sufficient effect of the fiber carbon contained.

The specific area of the aforementioned fiber carbon is preferably not greater than 50 $m^2/g$ and more preferably, not less than 0.5 $m^2/g$ and not greater than 50 $m^2/g$. When the specific area is greater than 50 $m^2/g$, the cell initial capacity is decreased. Moreover, when the specific area is smaller than 0.5 $m^2/g$, it is impossible to obtain a sufficient effect of the fiber carbon contained.

The bulk density of the aforementioned fiber carbon is in a range not less than 0.01 $g/cm^3$ and not greater than 1.8 $g/cm^3$. When the bulk density is below 0.01 $g/cm^3$, the cell initial capacity is lowered. Moreover, when the bulk density is greater than 1.8 $g/cm^3$, it is impossible to obtain a sufficient effect of the fiber carbon contained.

The non-aqueous electrolytic liquid is prepared by solving an electrolytic material in a non-aqueous solvent.

The electrolytic material may be any of the known electrolytic material conventionally used for a cell electrolytic liquid. More specifically, there can be exemplified $LiPF_6$, $LiBF_4$, $LiAsF_6$, $LiClO_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiB(C_6H_5)_4$, LiCl, LiBr, and the like.

Moreover, the aforementioned non-aqueous solvent may be any of the known non-aqueous solvents conventionally used for the non-aqueous electrolytic liquid such as propylene carbonate, ethylene carbonate, vinylene carbonate, 1,2-dimethoxyethane, 1,2-ethoxyethane, diethyl carbonate, dimethyl carbonate, $\gamma$-butyrolactone, tetrahydrofuran, 2-methyltetrahydrofuran, 1,3-dioxolane, 4-methyl-1,3-dioxolane, diethyl ether, sulfolane, methylsulfolane, acetonitrile, propiononitrile, methyl propionate, methyl butyrate, and the like. Each of these non-aqueous solvents may be used solely or in combination with the others.

The non-aqueous electrolytic cell1 is prepared as follows.

The positive electrode is prepared by uniformly applying the positive electrode composite agent containing a positive electrode active material and an adhesive as has been explained above, onto a metal foil such as an aluminium foil to serve as a positive electrode current collector and drying the positive electrode composite agent so as to form a positive electrode active material layer.

The negative electrode 3 is prepared by uniformly applying the negative electrode composite agent containing a negative electrode active material and an adhesive as has been described above, onto a metal foil such as a copper foil to serve as the negative electrode current collector, and drying the negative electrode composite agent so as to form a negative electrode active material layer.

The positive electrode and the negative electrode 3 thus obtained are attached to each other via the separator 4 made from, for example, a porous polypropylene film and wound into an eddy shape so as to obtain a wound layered body.

Next, an insulation plate 6 is inserted onto the bottom of the cell can and the wound layered body is placed. The cell can 5 may be made from iron, nickel, stainless steel, aluminium, titanium, or the like. In case the cell operation causes electro-chemical corrosion of the cell can in the non-aqueous electrolytic liquid, the can may be plated.

Next, for current collection of the negative electrode, one end of a negative electrode lead wire 7 made from, for example, nickel is fixed to the negative electrode 3 and the other end is welded to the cell can 5. Thus, the cell can 5 becomes conductive to the negative electrode 3 and serves as an external negative electrode of the non-aqueous electrolytic cell. Moreover, for current collection of the positive electrode 2, one end of a positive electrode lead wire 8 made from, for example, aluminium is attached to the positive electrode 2 and the other end is electrically connected to a cell cover 10 via a current cut-off thin plate 9. The current cut-off thin plate 9 cuts off current according to the cell inner pressure. Thus, the cell cover 10 becomes conductive to the positive electrode and serves as an external positive electrode of the non-aqueous electrolytic cell 1.

Next, a non-aqueous electrolytic liquid is poured into the cell can 5. This non-aqueous electrolytic liquid, as has been described above, is prepared by solving an electrolytic material in a non-aqueous solvent.

Next, the cell can 5 is caulked via an insulation seal gasket 11 coated with asphalt, so as to fix the cell cover 10 and obtain the non-aqueous electrolytic cell 1 of a cylindrical shape.

It should be noted that as shown in FIG. 1, this non-aqueous electrolytic cell 1 includes: a center pin 12 for connecting the negative lead wire 7 and the positive lead wire 8; a safety valve apparatus 13 for removing the inner gas when the pressure inside the cell has become above a predetermined value; and a PTC element 14 for preventing the temperature increase in the cell.

The non-aqueous electrolytic cell 1 according to the aforementioned embodiment is not to be limited t a particular shape and may have any shape such as a cylindrical, rectangular, coin or button shape and may have any size such as thin type or large size type.

In the aforementioned embodiment, the non-aqueous electrolytic cell has been explained as a non-aqueous electrolytic liquid cell using a non-aqueous electrolytic liquid. However, the present invention is not to be limited to this. The present invention can be applied to a case when the non-aqueous electrolytic material is a so-called polymer gel electrolytic material, i.e., a high-molecular compound such as polyvinylidene fluoride and polyacrylonitrile containing a non-aqueous solvent. Moreover, the present invention can be applied to a primary cell and to a secondary cell.

EXAMPLES

Next, explanation will b given on specific examples of the present invention.

Example 1

Firstly, a graphite powder was prepared to be used for the negative electrode.

For 100 weight parts of coal coke, 30 weight parts of coal tar pitch is added and mixed at about 100° C., after which the mixture is compression-molded by a press to obtain a carbon molded precursor. The carbon molded precursor is subjected to a thermal treatment at a temperature not greater than 1000° C. to obtain a carbon molded body.

This carbon molded body was impregnated with a binder pitch solved at a temperature not greater than 200° C., after which a thermal treatment was performed at a temperature not greater than 1000° C. This process of pitch impregnation and the sintering was repeated several times. After this, the carbon molded body was subjected to a thermal treatment in an inert gas stream at 2700° C. to obtain a graphitized molded body, which was crushed into several classes to prepare a graphite powder.

The graphite powder was subjected to an X-ray structure analysis and it was found that the plane interval of the (002) plane was 0.337 nm and the C axis of the (002) plane had a thickness of 50.0 nm. The pyrometer method was applied to find that the graphite powder had true density of 2.23 g/cm$^3$ and a bulk density of 0.83 g/cm$^3$. The Brunauer-Emmett-Teller method (BET method) was used to find that the graphite powder had a specific area of 4.4 m$^2$/g. The graphite powder was subjected to a laser analysis method to find that the average grain diameter of the grain size distribution was 3.12 μm; the accumulative 10% grain diameter was 12.3 μm; the accumulative 50% grain diameter was 29.5 μm; and the accumulative 90% grain diameter was 53.7 μm. Moreover, by the aforementioned laser analysis method, it was found that the graphite powder had a graphite grain breaking strength of 7.1 kgf/mm$^2$ as an average.

The graphite powder thus prepared was mixed with 1 weight % of fiber carbon having an outer diameter of 0.2 μm, a specific area of 15 m$^2$/g, and bulk density of 0.1 g/cm$^3$ to obtain a negative electrode material.

The negative electrode material was used to prepare a negative electrode. 90 weight parts of the negative electrode material was mixed with 10 weight parts of polyvinylidene fluoride (PVDF) as a binder, and the mixture was dispersed in N-methylpyrolidone into a slurry state to obtain a negative electrode composite agent slurry. The negative electrode composite agent slurry was uniformly applied onto the both surfaces of a belt-shaped copper foil having a thickness of 10 μm serving as a negative electrode current collector and after dried, pressure-molded with a constant pressure to obtain a belt-shaped negative electrode.

Next, a positive electrode was prepared as follows. Lithium carbonate 0.5 mol was mixed with cobalt carbonate 1 mol and this mixture was burnt in the atmosphere at temperature of 900° C. for 5 hours. The burnt material was subjected to an X-ray structure analysis and it was found that the peak almost matched with LiCoO$_2$ registered in the JCPDS file. That is, the burnt material was identified as LiCoO$_2$. The LiCoO$_2$ was crushed to a degree that the 50% grain diameter obtained by the laser analysis method was 15 μm, so as to obtain LiCoO$_2$ powder.

Then, 95 weight parts of the LiCoO$_2$ powder was mixed with 5 weight parts of lithium carbonate powder. 91 weight parts of the mixture, 6 weight parts of scaly graphite as a conductive agent, and 3 weight parts of PVDF as a binder were mixed and dispersed in N-methylpyrolidone as a solvent to obtain a slurry state, i.e., a positive electrode composite agent slurry. The positive electrode composite agent slurry was uniformly applied onto the both sides of a belt shaped aluminium foil having a thickness of 20 μm serving as a positive electrode current collector and after dried, pressure-molded with a constant pressure to obtain a belt-shaped positive electrode.

Next, the electrodes and the separator were layered in the order of the negative electrode, the separator, the positive electrode, and the separator. The layered body was wound plenty of times to obtain a wound electrode body. The separator used was a porous polypropylene film having a thickness of 25 μm. The outer diameter of the wound electrode body was 18 mm.

The wound electrode body thus prepared was placed in a cell can plated with nickel. An insulator was arranged on the upper and lower surfaces of the wound electrode body, and the aluminium positive electrode lead wire was brought out from the positive electrode current collector and welded to the cell cover. Moreover, the nickel negative electrode lead wire was brought out from the negative electrode current body and welded to the cell can.

Next, a non-aqueous electrolytic liquid was poured into the cell can. The non-aqueous electrolytic liquid was prepared by mixing identical volumes of ethylene carbonate (EC) and dimethyl carbonate (DMC), to which 1.0 mol/l of LiPF$_6$ was added.

Next, the cell can was caulked via an insulation seal gasket having a surface coated with asphalt, so as to fix the safety apparatus having the current cut-off mechanism, the PTC element, and the cell cover and to maintain airtightness in the cell. Thus, a cylindrical non-aqueous electrolytic secondary cell having a diameter of 18 mm and height of 65 mm was prepared.

Example 2

A cylindrical non-aqueous electrolytic secondary cell was prepared in the same way as Example 1 except for that the quantity of fiber carbon to be mixed in the negative electrode material was 2 weight %.

Example 3

A cylindrical non-aqueous electrolytic secondary cell was prepared in the same way as Example 1 except for that the quantity of fiber carbon to be mixed in the negative electrode material was 3 weight %.

Example 4

A cylindrical non-aqueous electrolytic secondary cell was prepared in the same way as Example 1 except for that the quantity of fiber carbon to be mixed in the negative electrode material was 4 weight %.

Example 5

A cylindrical non-aqueous electrolytic secondary cell was prepared in the same way as Example 1 except for that the quantity of fiber carbon to be mixed in the negative electrode material was 4.8 weight %.

Example 6

A cylindrical non-aqueous electrolytic secondary cell was prepared in the same way as Example 1 except for that the quantity of fiber carbon to be mixed in the negative electrode material was 0.05 weight %.

Example 7

A cylindrical non-aqueous electrolytic secondary cell was prepared in the same way as Example 1 except for that the quantity of fiber carbon to be mixed in the negative electrode material was 0.02 weight %.

Example 8

A cylindrical non-aqueous electrolytic secondary cell was prepared in the same way as Example 1 except for that the quantity of fiber carbon to be mixed in the negative electrode material was 0.01 weight %.

Example 9

A cylindrical non-aqueous electrolytic secondary cell was prepared in the same way as Example 1 except for that the quantity of fiber carbon to be mixed in the negative electrode material was 5 weight %.

Example 10

A cylindrical non-aqueous electrolytic secondary cell was prepared in the same way as Example 1 except for that the quantity of fiber carbon to be mixed in the negative electrode material was 6 weight %.

Example 11

A cylindrical non-aqueous electrolytic secondary cell was prepared in the same way as Example 1 except for that the fiber carbon to be mixed in the negative electrode material had an outer diameter of 0.1 μm and a specific area of 18 m$^2$/g.

Example 12

A cylindrical non-aqueous electrolytic secondary cell was prepared in the same way as Example 1 except for that the fiber carbon to be mixed in the negative electrode material had an outer diameter of 0.01 μm and a specific area of 25 m$^2$/g.

Example 13

A cylindrical non-aqueous electrolytic secondary cell was prepared in the same way as Example 1 except for that the fiber carbon to be mixed in the negative electrode material had an outer diameter of 0.008 μm and a specific area of 50 m$^2$/g.

Example 14

A cylindrical non-aqueous electrolytic secondary cell was prepared in the same way as Example 1 except for that the fiber carbon to be mixed in the negative electrode material had an outer diameter of 1 μm and a specific area of 9 m$^2$/g.

Example 15

A cylindrical non-aqueous electrolytic secondary cell was prepared in the same way as Example 1 except for that the fiber carbon to be mixed in the negative electrode material had an outer diameter of 0.007 μm and a specific area of 70 m$^2$/g.

Example 16

A cylindrical non-aqueous electrolytic secondary cell was prepared in the same way as Example 1 except for that the fiber carbon to be mixed in the negative electrode material had an outer diameter of 0.3 μm and a specific area of 5 m$^2$/g.

Example 17

A cylindrical non-aqueous electrolytic secondary cell was prepared in the same way as Example 1 except for that the fiber carbon to be mixed in the negative electrode material had an outer diameter of 20 μm, a specific area of 0.5 m$^2$/g, and a bulk density of 1.6 g/cm$^3$.

Example 18

A cylindrical non-aqueous electrolytic secondary cell was prepared in the same way as Example 1 except for that the fiber carbon to be mixed in the negative electrode material had a specific area of 20 m$^2$/g and a bulk density of 0.005 g/cm$^3$.

Example 19

A cylindrical non-aqueous electrolytic secondary cell was prepared in the same way as Example 1 except for that the fiber carbon to be mixed in the negative electrode material had an outer diameter of 30 μm, a specific area of 0.2 m$^2$/g, and a bulk density of 1.8 g/cm$^3$.

Example 20

A cylindrical non-aqueous electrolytic secondary cell was prepared in the same way as Example 1 except for that the fiber carbon to be mixed in the negative electrode material had a specific area of 20 m$^2$/g and a bulk density of 0.5 g/cm$^3$.

Example 21

A cylindrical non-aqueous electrolytic secondary cell was prepared in the same way as Example 1 except for that the fiber carbon to be mixed in the negative electrode material had an outer diameter of 0.09 μm, a specific area of 20 m$^2$/g, and a bulk density of 0.01 g/cm$^3$.

Comparative Example 1

A cylindrical non-aqueous electrolytic secondary cell was prepared in the same way as Example 1 except for that the negative material did not contain any fiber carbon.

The cells thus prepared were charged. The charge conditions were as follows: the temperature was 23° C., the constant current was 0.5 A, the maximum voltage was 4.2V, the charge was performed with a constant current and a constant voltage, and the charge time was 4 hours. Next discharge was performed at 23° C. with a constant current of 0.5 A until the final voltage became 2.75V to check the initial capacity of the aforementioned cells.

Next, the cells were again charged under the conditions as follows. The temperature was 23° C., the constant current was 1.0 A, the maximum voltage was 4.2V, the charge was performed with a constant current and a constant voltage, and the charge time was 2.5 hours.

Next, cell characteristic were checked at a low temperature. Firstly, the cells were placed under the temperature of −35° C. for 3 hours. After this, under the temperature of −35° C., with a frequency of 1 KHz, and voltage of 10 mV applied, the AC impedance was measured to check the cell internal resistance. After this, at the temperature of −35° C. with a constant current 0.7 A, discharge was performed until the final voltage became 2.75V, so as to check the cell capacity.

Table 1 below shows results of the aforementioned measurements on the initial capacity, the cell internal resistance at −35° C., and the cell capacity at −35° C. of the cells prepared in Examples 1 to 21 and Comparative Example 1.

TABLE 1

| | Fiber carbon content (weight %) | Fiber carbon outer diameter (μm) | Fiber carbon specific area (m$^2$/g) |
|---|---|---|---|
| Example 1 | 1.00 | 0.200 | 15.0 |
| Example 2 | 2.00 | 0.200 | 15.0 |
| Example 3 | 3.00 | 0.200 | 15.0 |
| Example 4 | 4.00 | 0.200 | 15.0 |
| Example 5 | 4.80 | 0.200 | 15.0 |
| Example 6 | 0.05 | 0.200 | 15.0 |
| Example 7 | 0.02 | 0.200 | 15.0 |

TABLE 1-continued

| | | | |
|---|---|---|---|
| Example 8 | 0.01 | 0.200 | 15.0 |
| Example 9 | 5.00 | 0.200 | 15.0 |
| Example 10 | 6.00 | 0.200 | 15.0 |
| Example 11 | 1.00 | 0.100 | 18.0 |
| Example 12 | 1.00 | 0.010 | 25.0 |
| Example 13 | 1.00 | 0.008 | 50.0 |
| Example 14 | 1.00 | 1.000 | 9.0 |
| Example 15 | 1.00 | 0.007 | 70.0 |
| Example 16 | 1.00 | 0.300 | 5.0 |
| Example 17 | 1.00 | 20.000 | 0.5 |
| Example 18 | 1.00 | 0.200 | 20.0 |
| Example 19 | 1.00 | 30.000 | 0.2 |
| Example 20 | 1.00 | 0.200 | 20.0 |
| Example 21 | 1.00 | 0.090 | 20.0 |
| Comparative Example 1 | 0.00 | — | — |

| | Fiber carbon bulk density ($g/cm^3$) | Initial capacity (mAh) |
|---|---|---|
| Example 1 | 0.100 | 1625 |
| Example 2 | 0.100 | 1622 |
| Example 3 | 0.100 | 1615 |
| Example 4 | 0.100 | 1605 |
| Example 5 | 0.100 | 1606 |
| Example 6 | 0.100 | 1625 |
| Example 7 | 0.100 | 1608 |
| Example 8 | 0.100 | 1624 |
| Example 9 | 0.100 | 1602 |
| Example 10 | 0.100 | 1595 |
| Example 11 | 0.100 | 1620 |
| Example 12 | 0.100 | 1615 |
| Example 13 | 0.100 | 1614 |
| Example 14 | 0.100 | 1620 |
| Example 15 | 0.100 | 1532 |
| Example 16 | 0.100 | 1616 |
| Example 17 | 1.600 | 1603 |
| Example 18 | 0.005 | 1554 |
| Example 19 | 1.800 | 1601 |
| Example 20 | 0.500 | 1630 |
| Example 21 | 0.010 | 1600 |
| Comparative Example 1 | — | 1600 |

| | Cell capacity at −35° C. (mAh) | Cell internal resistance at −35° C. (mΩ) |
|---|---|---|
| Example 1 | 400 | 88 |
| Example 2 | 481 | 70 |
| Example 3 | 502 | 68 |
| Example 4 | 405 | 72 |
| Example 5 | 350 | 90 |
| Example 6 | 332 | 105 |
| Example 7 | 270 | 128 |
| Example 8 | 62 | 140 |
| Example 9 | 70 | 138 |
| Example 10 | 64 | 141 |
| Example 11 | 385 | 90 |
| Example 12 | 472 | 72 |
| Example 13 | 479 | 70 |
| Example 14 | 288 | 121 |
| Example 15 | 323 | 86 |
| Example 16 | 370 | 92 |
| Example 17 | 266 | 129 |
| Example 18 | 367 | 95 |
| Example 19 | 68 | 139 |
| Example 20 | 500 | 67 |
| Example 21 | 479 | 70 |
| Comparative Example 1 | 59 | 152 |

Table 1 shows that Examples 1 to 21 using fiber carbon in the negative electrode material have smaller internal resistance values at −35° C. and greater cell capacity values than Comparative Example 1 not using the fiber carbon in the negative electrode material. The reason is considered to be that when fiber carbon is inserted between negative electrode grains, the electrolytic liquid has a greater strength to maintain the liquid state and lithium ions are doped and dedoped smoothly even at a low temperature.

However, as can be seen from Example 8, when the content of the fiber carbon in the negative electrode material is 0.01 weight %, the internal resistance at −35° C. is increased and it is impossible to obtain a sufficient effect to reduce the cell capacity value. Moreover, as can be seen from Example 9 and Example 10, when the content of the fiber carbon in the negative electrode material is not less than 5 weight %, the internal resistance at −35° C. is increased and the cell capacity value becomes smaller. Consequently, the content of the fiber carbon in the negative electrode material is preferably in a range not less than 0.02 weight % and below 5 weight %. Moreover, as can be seen from Examples 1 to 7, the range is more preferably not less than 0.05 weight % and not greater than 4 weight %.

Moreover, as can be seen from Example 19, when the outer diameter of the fiber carbon contained in the negative electrode material is 30 μm, the internal resistance at −35° C. is increased and it is impossible to obtain a sufficient effect to reduce the cell capacity value. As can be seen from the comparison between Example 1, Examples 11 to 14, Example 16 and 17, and Example 21, the outer diameter of the fiber carbon in the negative electrode material is preferably in a range not greater than 20 μm.

Furthermore, as can be seen from Example 15, when the specific area of the fiber carbon contained in the negative electrode material is 70 $m^2/g$, the initial capacity value is lowered than Comparative Example 1 although the internal resistance at −35° C. and the cell capacity value remain unchanged. The comparison between Example 1, Examples 11 to 14, Examples 16 and 17, and Examples 20 and 21 shows that the specific area of the fiber carbon in the negative electrode material is preferably in a range not greater than 50 $m^2/g$. Moreover, as can be seen from Example 19, when the specific area is 0.2 $m^2/g$, although the cell initial capacity value remains unchanged, the internal resistance at −35° C. is increased and it is impossible to obtain a sufficient effect to reduce the cell capacity value. Accordingly, the specific area of the fiber carbon in the negative electrode material is more preferably in a range not less than 0.5 $m^2/g$ and not greater than 50 $m^2/g$.

Moreover, as can be seen from Example 18, when the bulk density of the fiber carbon in the negative electrode material is 0.005 $g/cm^3$, although the internal resistance at −35° C. and the cell capacity value are improved, the cell initial capacity is lowered than Comparative Example 1. The comparison between Example 1, Example 17, and Examples 20 and 21 shows that the bulk density of the fiber carbon in the negative electrode material is preferably in a range not less than 0.01 $g/cm^3$. Moreover, as can be seen from Example 19, when the bulk density of the fiber carbon contained in the negative electrode material is 1.8 $g/cm^3$, although the cell initial capacity remains unchanged, the internal resistance at −35° C. is increased and it is impossible to obtain a sufficient effect to reduce the cell capacity value. Accordingly, the bulk density of the fiber carbon in the negative electrode material is more preferably in a range not less than 0.01 $g/cm^3$ and not greater than 1.8 $g/cm^3$.

As is clear from the above given explanation, since the non-aqueous electrolytic cell according to the present invention contains fiber carbon in the negative electrode, the internal resistance value at a low temperature is lowered and the cell resistance value is increased. Accordingly, the cell can also be used at a low temperature.

What is claimed is:

1. A nonaqueous electrolytic cell comprising a negative electrode capable of doping and dedoping lithium ions, a positive electrode capable of doping and dedoping lithium ions, and a non-aqueous electrolyte, wherein the negative electrode contains fiber carbon in a range not less than 0.02 weight % and not greater than 5 weight.

2. A non-aqueous electrolytic cell as claimed in claim 1, wherein the fiber carbon has an outer diameter in a range not greater than 20 μm.

3. A non-aqueous electrolytic cell as claimed in claim 1, wherein the fiber carbon has a specific area in a range not greater than 50 m$^2$/g.

4. A non-aqueous electrolytic cell as claimed in claim 1, wherein the fiber carbon has a bulk density in a range not less than 0.01 g/cm$^3$.

5. A non-aqueous electrolytic cell as claimed in claim 1, wherein the negative electrode capable of doping and dedoping lithium ions contains a negative electrode material selected from a group consisting of a carbon material, a polymer, and an oxide.

6. A non-aqueous electrolytic cell as claimed in claim 5, wherein the carbon material is a non-graphitizable carbon or graphite.

7. A non-aqueous electrolytic cell as claimed in claim 1, the positive electrode capable of doping an dedoping lithium ions contains a positive electrode material selected from a group consisting of $TiS_2$, $MoS_2$, $NbSe_2$, $V_{2O5}$, and $LiM_xO_2$ (where M represents one or more than one transition metal and x differs depending on the cell charge/discharge state and is normally not less than 0.05 and not greater than 1.10).

8. A non-aqueous electrolytic cell as claimed in claim 1, wherein the electrolyte is at least one selected from a group consisting of $LiPF_6$, $LiBF_4$, $LiAsF_6$, $LiClO_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiB(C_6H_5)_4$, $LiCl$, and $LiBr$.

9. A non-aqueous electrolytic cell as claimed in claim 1, wherein the negative electrode capable of doping and dedoping lithium ions contains a negative electrode material selected from a group consisting of a carbon material, polyacetylene, polypyrol, and an oxide.

* * * * *